(12) United States Patent
Lin et al.

(10) Patent No.: US 12,466,515 B2
(45) Date of Patent: Nov. 11, 2025

(54) CRANK APPARATUS EQUIPPED WITH LABOR-SAVING MECHANISM AND BICYCLE CRANK ASSEMBLY

(71) Applicants: Hsuan-Chih Lin, New Taipei (TW); Kai-Wen Lin, New Taipei (TW)

(72) Inventors: Hsuan-Chih Lin, New Taipei (TW); Kai-Wen Lin, New Taipei (TW)

(*) Notice: Subject to any disclaimer, the term of this patent is extended or adjusted under 35 U.S.C. 154(b) by 0 days.

(21) Appl. No.: 18/603,510

(22) Filed: Mar. 13, 2024

(65) Prior Publication Data
US 2024/0317356 A1   Sep. 26, 2024

(30) Foreign Application Priority Data
Mar. 21, 2023 (TW) ................. 112110515

(51) Int. Cl.
*B62M 3/00* (2006.01)
*B62M 1/36* (2013.01)
*B62M 3/04* (2006.01)
*B62M 11/02* (2006.01)

(52) U.S. Cl.
CPC .......... *B62M 3/04* (2013.01); *B62M 1/36* (2013.01); *B62M 11/02* (2013.01); *B62M 3/003* (2013.01)

(58) Field of Classification Search
CPC .......... B62M 1/36; B62M 3/00; B62M 3/003; B62M 2003/006; B62M 3/04; B62M 11/02; F16C 33/38; F16C 33/3825
See application file for complete search history.

(56) References Cited

U.S. PATENT DOCUMENTS

| 610,923 | A  | * | 9/1898 | Scheeren | B62M 3/04 74/594.3 |
|---|---|---|---|---|---|
| 7,520,196 | B2 | * | 4/2009 | Stallard | B62M 3/04 74/594.1 |
| 11,548,588 | B2 | * | 1/2023 | Lin | B62M 11/02 |

FOREIGN PATENT DOCUMENTS

| CH | 225699 A | * | 2/1943 |
|---|---|---|---|
| CN | 102099245 A | | 6/2011 |
| CN | 108928425 A | * | 12/2018 |

(Continued)

OTHER PUBLICATIONS

Machine translation of FR 1002832 A obtained on Apr. 17, 2025.*

(Continued)

*Primary Examiner* — Adam D Rogers
(74) *Attorney, Agent, or Firm* — HDLS IPR SERVICES; Chun-Ming Shih

(57) ABSTRACT

A crank apparatus equipped with a labor-saving mechanism and a bicycle crank assembly are disclosed. The crank apparatus includes a crank mechanism, a transmission mechanism, a supporting module and a rotating arm module. The crank mechanism includes a crank, an axle-end gear and a pedal-end gear. The transmission mechanism includes a rotating axle having a circular groove. The supporting module is adapted to sheathe the rotating axle and includes an outer ring and rollers received inside the circular grooves and clamped between the rotating axle and the outer ring. The rotating arm module includes a first rotating arm and a second rotating arm. One end of the second rotating arm is connected to the first rotating arm, and another end of the second rotating arm is connected to the pedal-end gear. Accordingly, the transmission stability and useful lifetime of the crank apparatus and bicycle crank assembly are increased.

8 Claims, 15 Drawing Sheets

(56) References Cited

FOREIGN PATENT DOCUMENTS

| EP | 0288334 | A1 | * | 10/1988 | | |
|----|---------|----|----|---------|---|---|
| EP | 4032794 | A1 | | 7/2022 | | |
| FR | 1002832 | A | | 3/1952 | | |
| TW | M549189 | U | * | 9/2017 | | |
| TW | 202028052 | A | * | 8/2020 | ............. | B62M 3/02 |
| TW | M614613 | U | | 7/2021 | | |
| TW | M651763 | U | | 2/2024 | | |

OTHER PUBLICATIONS

Machine translation of EP 0288334 A1 obtained on Apr. 17, 2025.*
Search Report dated Aug. 13, 2024 of the corresponding European patent application No. 24163931.9.
Office Action dated Oct. 11, 2024 of the corresponding Taiwan patent application No. 112110515.

* cited by examiner

CRANK APPARATUS EQUIPPED WITH LABOR-SAVING MECHANISM AND BICYCLE CRANK ASSEMBLY

BACKGROUND

Technical Field

The present disclosure relates to a bicycle crank device technology, and in particular, to a crank apparatus equipped with a labor-saving mechanism and a bicycle crank assembly.

Description of Related Art

A known bicycle crank refers to a shaft having a fixed length for connecting a pedal to a central axle of the bicycle. During the operation process of the bicycle, a user steps on the pedals to allow the pedals to perform circular motions with the central axle as the rotating center and the crank length as the radius of circular motions, thereby driving the bicycle driving devices of, such as, chainwheel and chain in order to move the bicycle forward.

For the currently existing crank apparatus widely applied to bicycles, the crank cannot be extended to increase the length of the moment arm when the pedal rotates to a position requiring force application, and consequently, the effect of increased torque cannot be achieved. There are some known designs allowing the crank to have an extendable characteristic; however, such designs of extendable tend to have poor ergonomics and are unable to perform consistent and inertial circular motions. In fact, such designs are, substantially, labor-consuming pedaling crank designs having complicated structures that are likely to cause fatigue of users. Furthermore, existing crank devices are found to have the drawbacks of short useful lifetime due to insufficient structural strengths and difficulty in alignment of parts during assembly. Accordingly, there is a need to overcome such drawbacks.

In view of the above, the inventor seeks to overcome the aforementioned drawbacks associated with the known terminal block and aims to provide an effective solution through extensive researches along with utilization of academic principles and knowledge.

SUMMARY

An objective of the present disclosure is to provide a crank apparatus equipped with a labor-saving mechanism and a bicycle crank assembly, which is capable of further enhancing the overall structural strength, improving the transmission stability and increasing the useful lifetime thereof.

To achieve the aforementioned objective, the present disclosure provides a crank apparatus equipped with a labor-saving mechanism, having a crank mechanism, a transmission mechanism, a plurality of supporting modules and a rotating arm module. The crank mechanism includes a crank, an axle-end gear arranged at one end of the crank and a pedal-end gear arranged at another end of the crank. The transmission mechanism is arranged at an internal of the crank, and the transmission mechanism includes a rotating axle, a first gear and a second gear, the rotating axle includes a first end and a second end, the first gear is connected to the first end and engaged with the axle-end gear for transmission, the second gear is connected to the second end and engaged with the pedal-end gear for transmission, at least one circular groove is formed at the first end and the second end respectively. The plurality of supporting modules is adapted to sheathe the first end and the second end of the rotating axle respectively, each one of the supporting modules includes an outer ring and a plurality of rollers, each one of the rollers is received inside each one of the circular grooves and clamped between the rotating axle and each one of the outer rings respectively. The rotating arm module includes a first rotating arm and a second rotating arm, one end of the second rotating arm is connected to the first rotating arm, another end of the second rotating arm is connected to the pedal-end gear.

To achieve the aforementioned objective, the present disclosure provides a crank assembly of a bicycle, the bicycle includes a central axle receiving seat, the crank assembly includes a central axle, a pair of crank apparatuses and a pair of attachment mechanisms. The central axle penetrates into the central axle receiving seat. Each one of the crank apparatuses is connected to one end of the central axle. Each one of the adapters is mounted to (sheathes) each one of the axle-end gear and arranged between each one of the crank and the central axle receiving seat.

The present disclosure is able to achieve the following technical effects. The ring slot design of the rotating axle is able to accommodate rollers of a larger diameter, and the thickness of the outer ring may be increased, in order to increase the strength and useful lifetime multiple times. The design of the positioning ring with an opening is able to allow the positioning ring to generate torsional deformation for mounting to the rotating axle and to be pushed into the outer ring for securement. The arrangement of the abutment walls is able to eliminate the axial pushing force in the vertical direction of the rotating axle, in order to achieve greater stability in the operation of the transmission mechanism. During the process of pedaling to achieve circular motions of the cranks, improper transmission issues of upper and lower dead spots and stopping may be eliminated. With the transmission between the helical gear and bevel gear, close engagement between the gears may be achieved for both clockwise and counterclockwise rotations of the crank, thereby reducing the generation of noise and further enhancing the transmission performance positioning precision.

DETAILED DESCRIPTION

Figure 1:
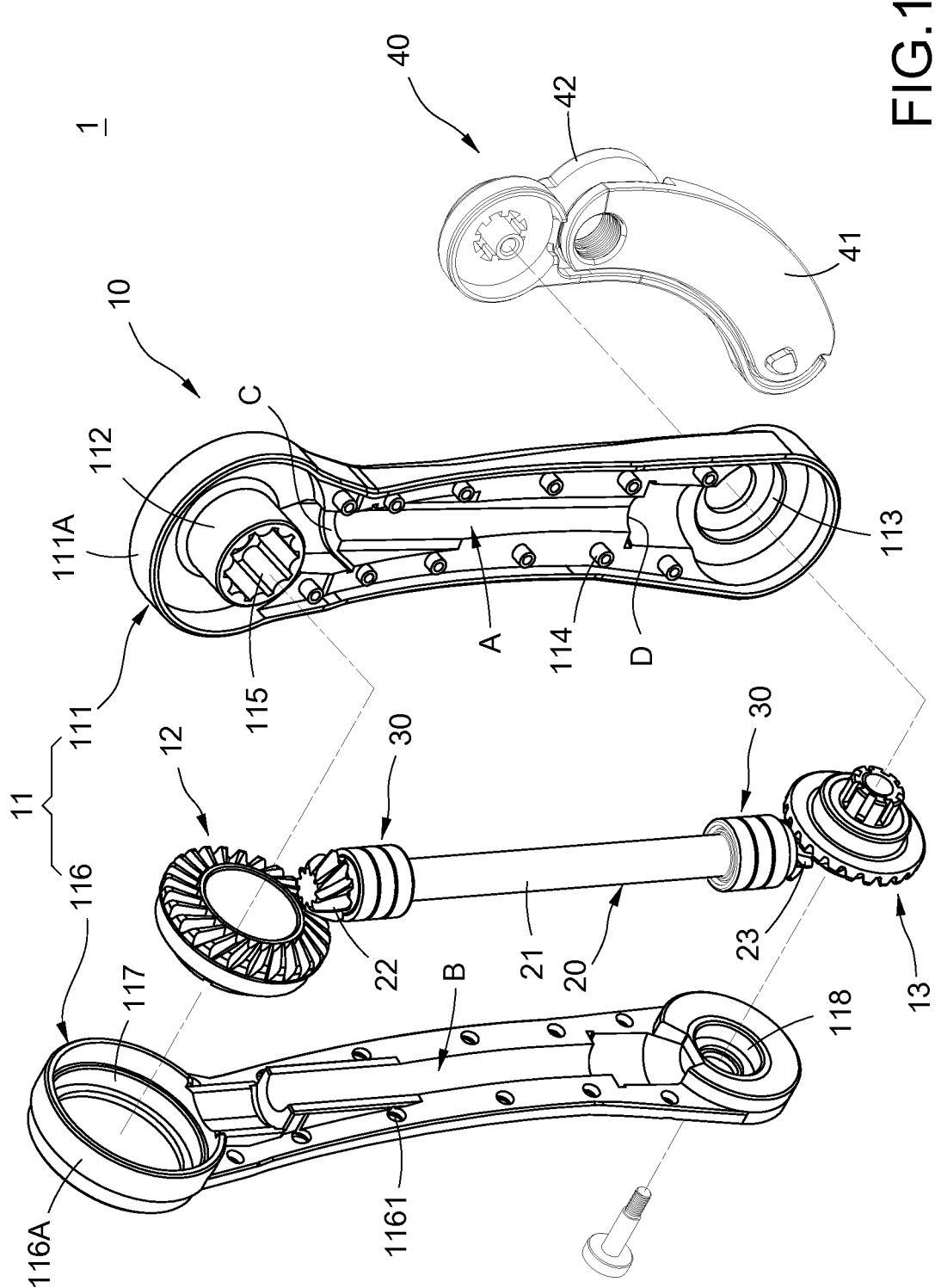
FIG. 1 is an exploded view of the crank apparatus equipped with a labor-saving mechanism of the present disclosure.

The technical contents of this disclosure will become apparent with the detailed description of embodiments accompanied with the illustration of related drawings as follows. It is intended that the embodiments and drawings disclosed herein are to be considered illustrative rather than restrictive.

Please refer to FIG. 1 to FIG. 7. The present disclosure provides a crank apparatus equipped with a labor-saving mechanism, wherein the crank apparatus 1 mainly includes a crank mechanism 10, a transmission mechanism 20, a plurality of supporting modules 30 and a rotating arm module 40.

Figure 2:
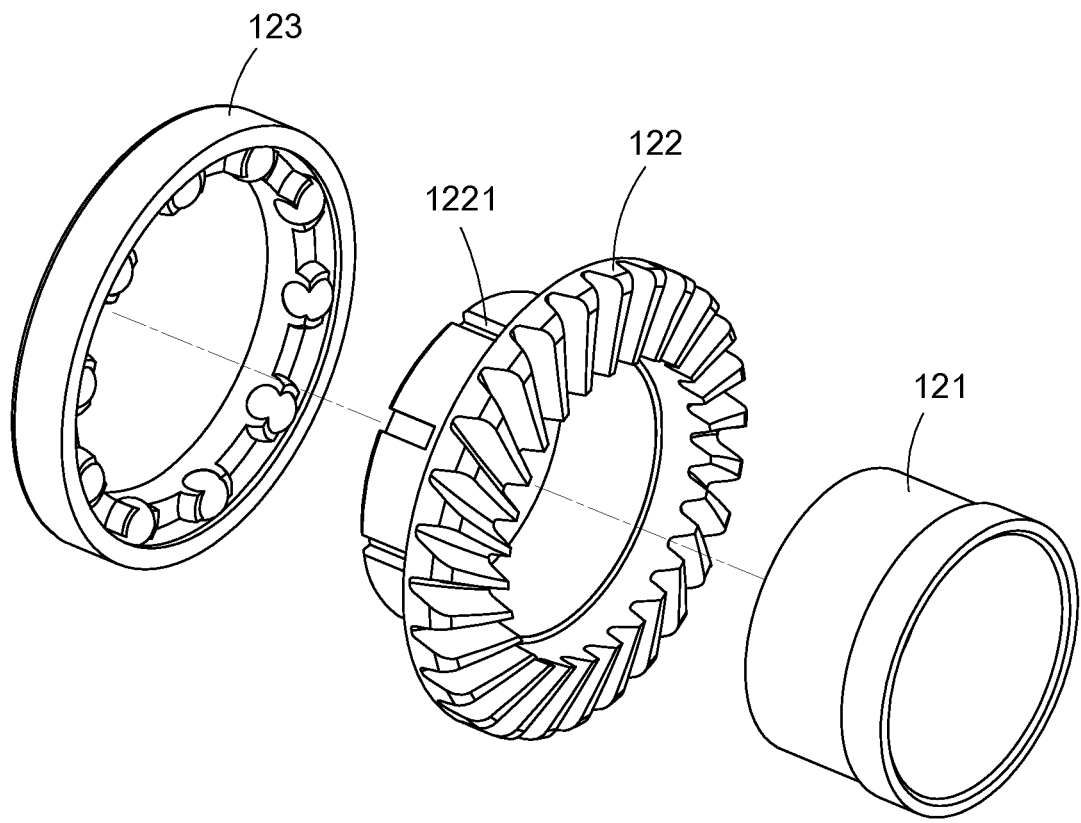
FIG. 2 is an exploded view of the axle-end gear of the present disclosure.
Figure 3:
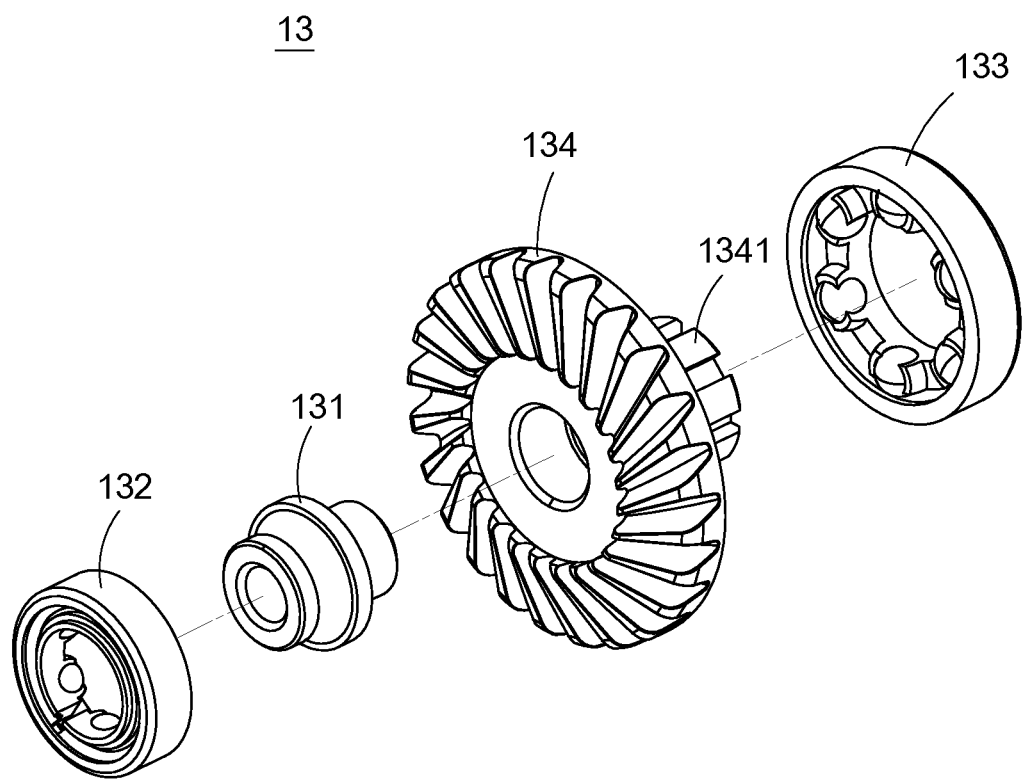
FIG. 3 is an exploded view of the pedal-end gear of the present disclosure.

Please refer to FIG. 1 to FIG. 3. The crank mechanism 10 mainly includes a crank 11, an axle-end gear 12 and a pedal-end gear 13. In an exemplary embodiment, the crank 11 mainly includes an outer housing 111 and an inner housing 116. The outer housing 111 includes a cylindrical column 112 extended from an upper end thereof and also includes a first attachment hole 113 formed at a lower end thereof. In addition, the internal of the outer housing 111 includes an axle-clamping half piece A arranged between the cylindrical column 112 and the first attachment hole 113. Furthermore, the outer housing 111 further includes a plurality of riveting columns 114 uniformly disposed on an inner circumferential surface thereof. Moreover, the cylindrical column 112 includes a gear-shaped hole 115 formed at an internal thereof.

The shape of the inner housing 116 is matched with the shape of the outer housing 111. The inner housing 116 includes a second attachment hole 117 formed at an upper end thereof and also includes an insertion hole 118 formed at a lower end thereof. The insertion hole 118 is arranged corresponding to the aforementioned first attachment hole 113, and the internal of the inner housing 116 further includes an another axle-clamping half piece B extended between the second attachment hole 117 and the insertion hole 118. The another axle-clamping half piece B is arranged corresponding to the aforementioned axle-clamping half piece A.

Figure 7:
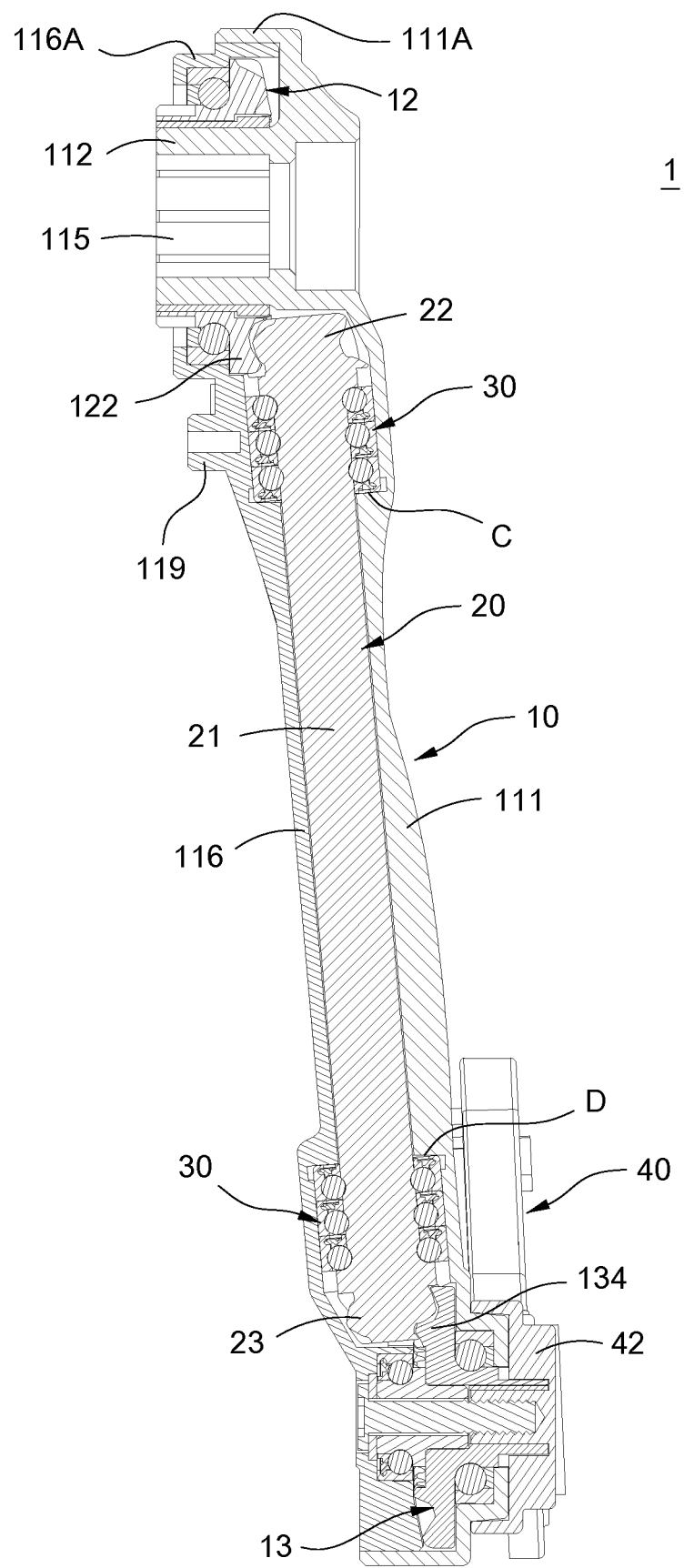
FIG. 7 is an assembly cross-sectional view of the crank apparatus equipped with a labor-saving mechanism of the present disclosure.
Figure 8:
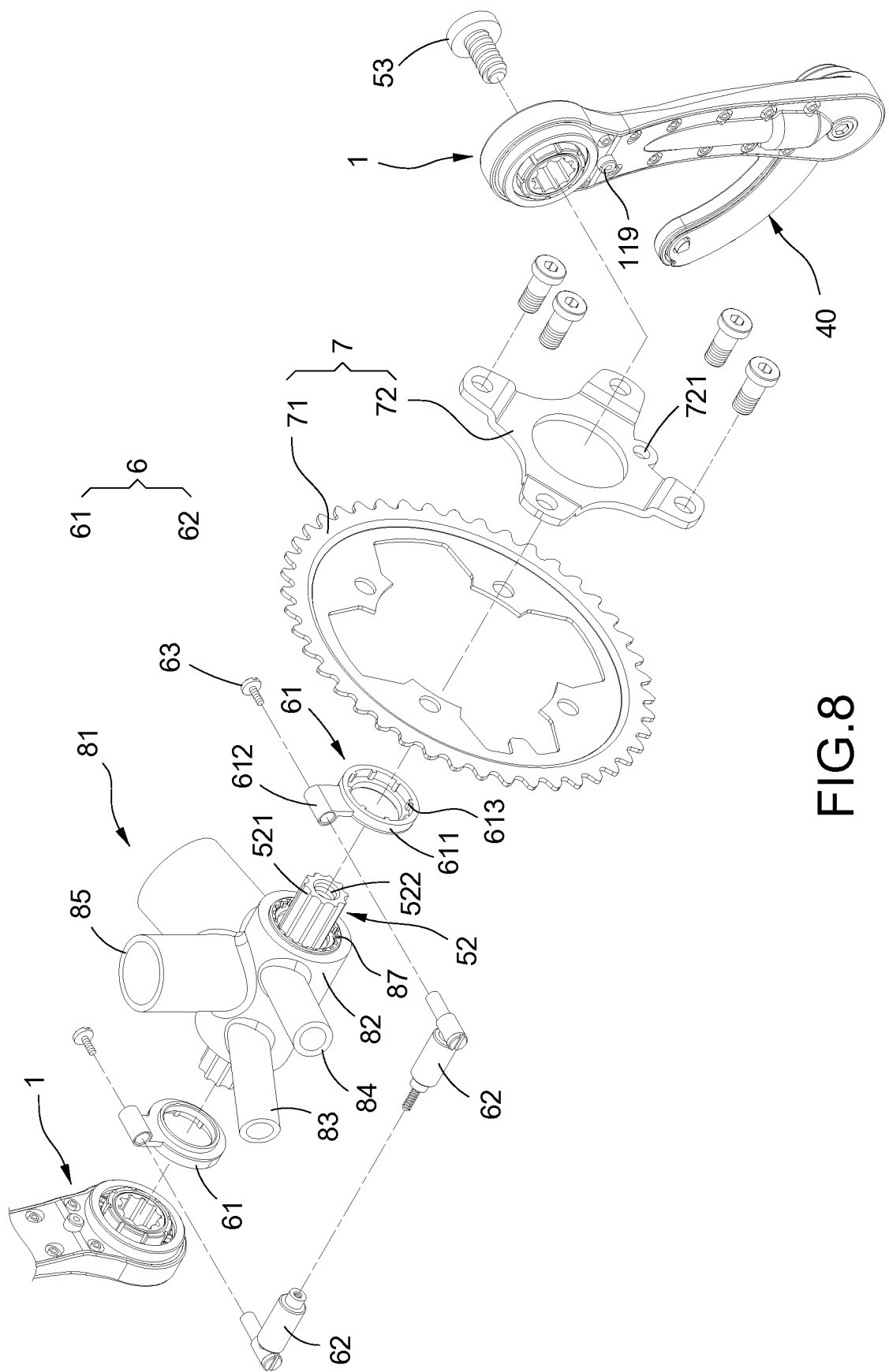
FIG. 8 is an exploded view of the bicycle crank assembly of the present disclosure and a bicycle frame.
Figure 9:
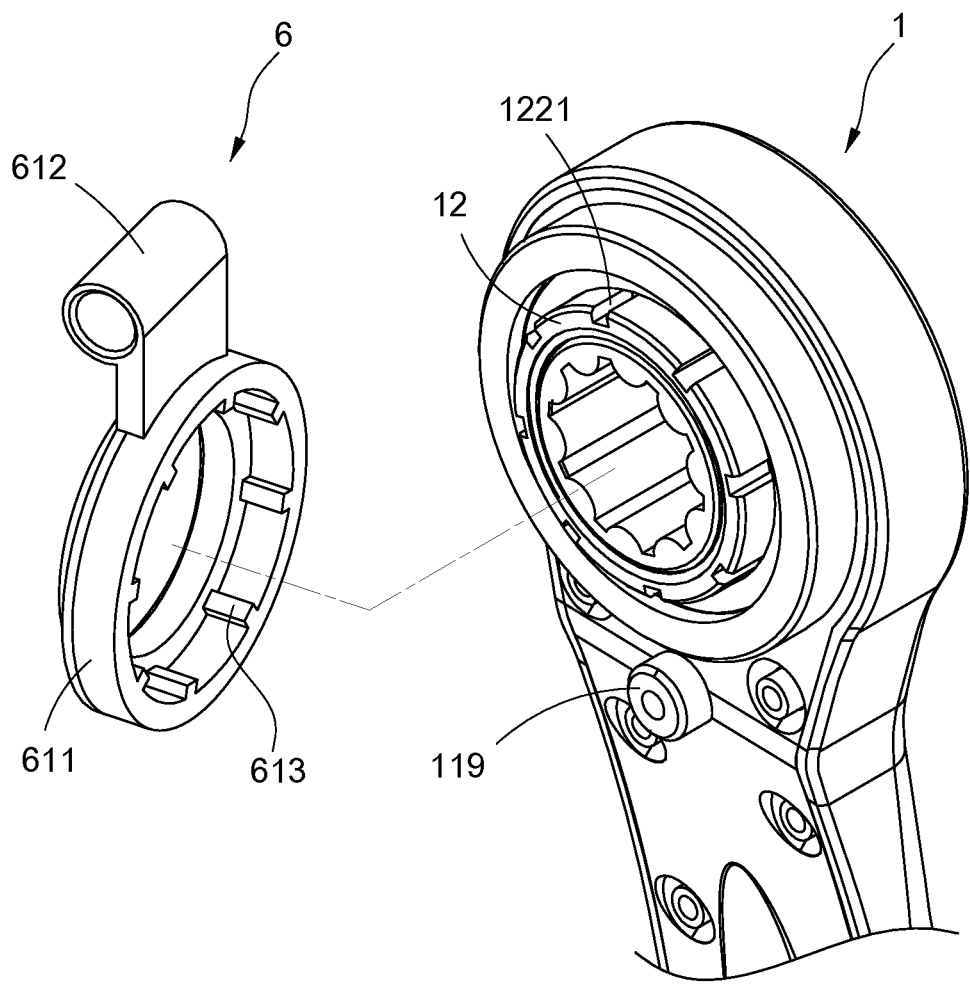
FIG. 9 is an exploded view of the crank apparatus equipped with a labor-saving mechanism and the abutment member of the present disclosure.
Figure 10:
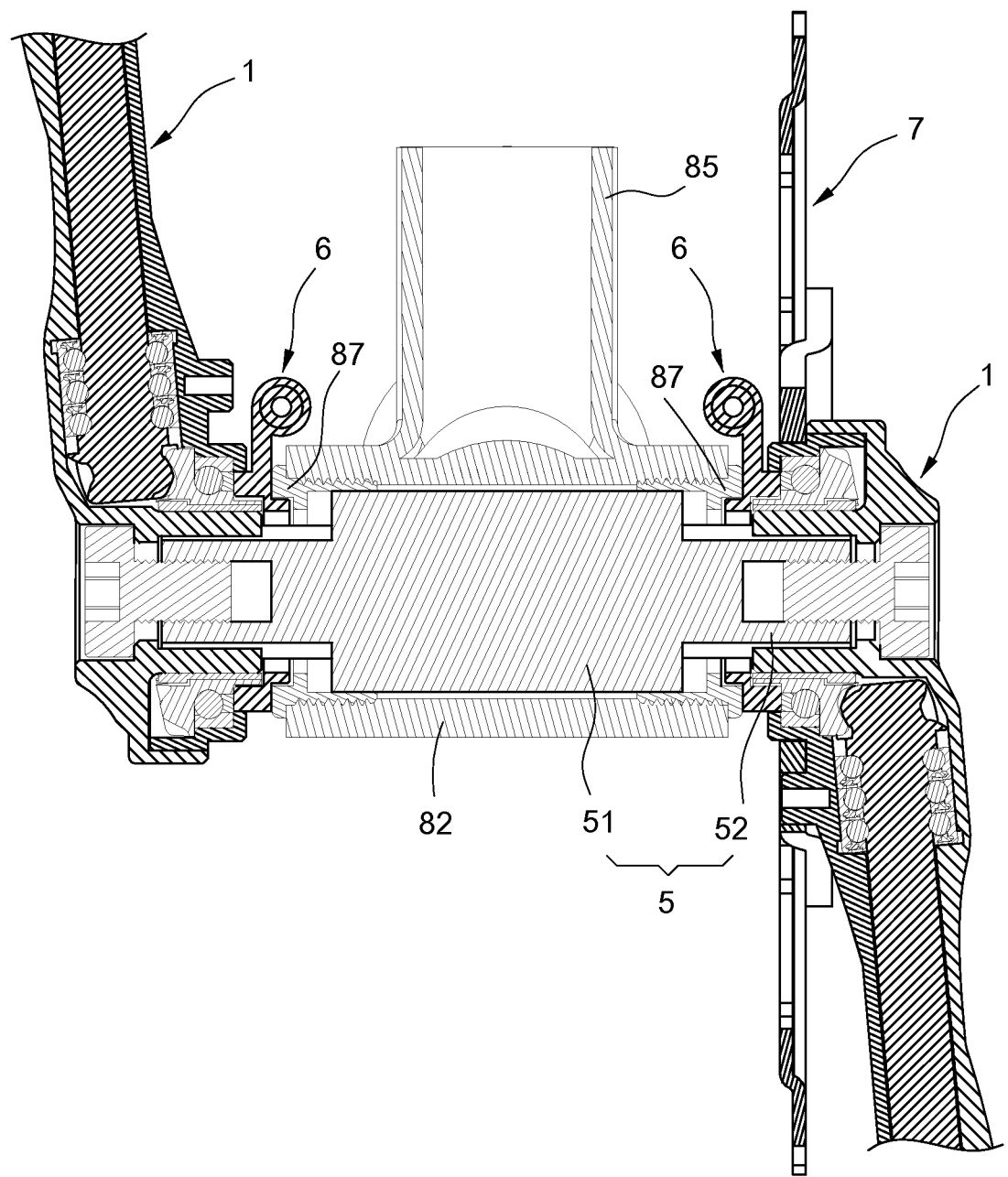
FIG. 10 is an assembly cross-sectional view of the bicycle crank assembly of the present disclosure and a bicycle frame.
Figure 11:
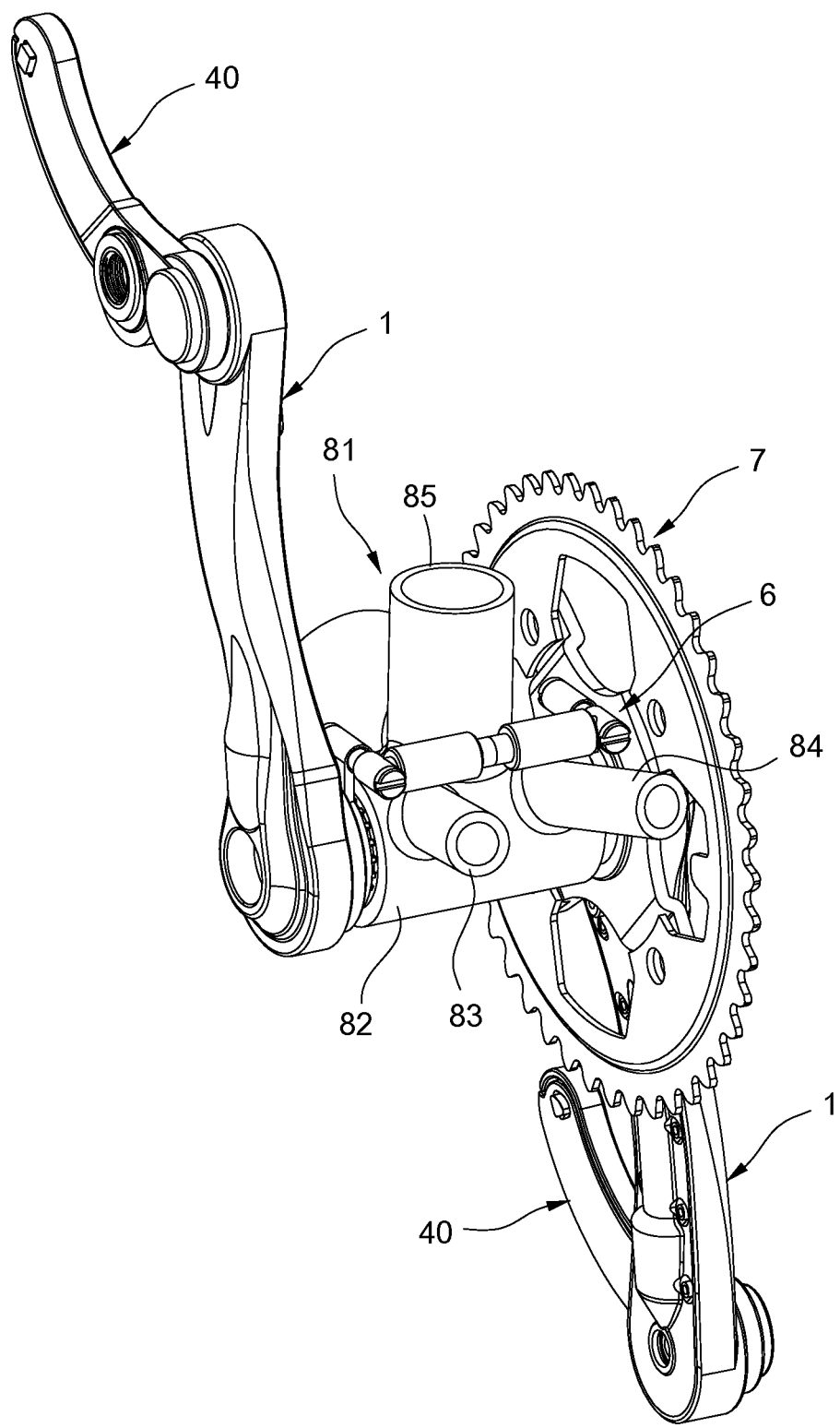
FIG. 11 is an assembly appearance view of the crank assembly of the present disclosure attached to a bicycle frame.

The axle-end gear 12 is a stationary gear (i.e., fixed without rotation) and is mounted to (sheathes) the cylindrical column 112 in order to further penetrate into the second attachment 117, such that the axle-end gear 12 is supported between the cylindrical column 112 and the inner housing 13 (as shown in FIG. 7). As shown in FIG. 2, the axle-end gear 12 mainly includes an inner bushing 121, a helical gear 122 and a roller bearing 123. The inner bushing 121 is mounted to (sheathes) the aforementioned cylindrical column 112, the helical gear 122 is mounted to (sheathes) the inner bushing 121, and the roller bearing 123 is mounted to (sheathes) the helical gear 122 and is clamped by the inner housing 116 and the helical gear 122 jointly. The helical gear 122 includes a plurality of insertion slots 1221 formed thereon, and the insertion slots 1221 are arranged spaced apart from each other at an equal distance.

The pedal-end gear 13 is a moving gear (i.e., being driven by the transmission mechanism 20 to rotate during the rotational movement of the crank 11) and is arranged between the first attachment hole 113 and the insertion hole 118, such that the pedal-end gear 13 is supported at the lower end of the outer housing 111 and the inner housing 116 (as shown in FIG. 7). As shown in FIG. 3, the pedal-end gear 13 mainly includes an axle sleeve 131, a front roller bearing 132, a rear roller bearing 133 and a helical gear 134. The axle sleeve 131 penetrates into the insertion hole 118 correspondingly, the front roller bearing 132 is mounted at (sheathes) one end of the axle sleeve 131 and received inside the insertion hole 118. The helical gear 134 is mounted at (sheathes) another end of the axle sleeve 131. The rear roller bearing 133 is mounted at (sheathes) the helical gear 134 and clamped by the outer housing 111 and the helical gear 134 jointly (as shown in FIG. 7).

Figure 4:
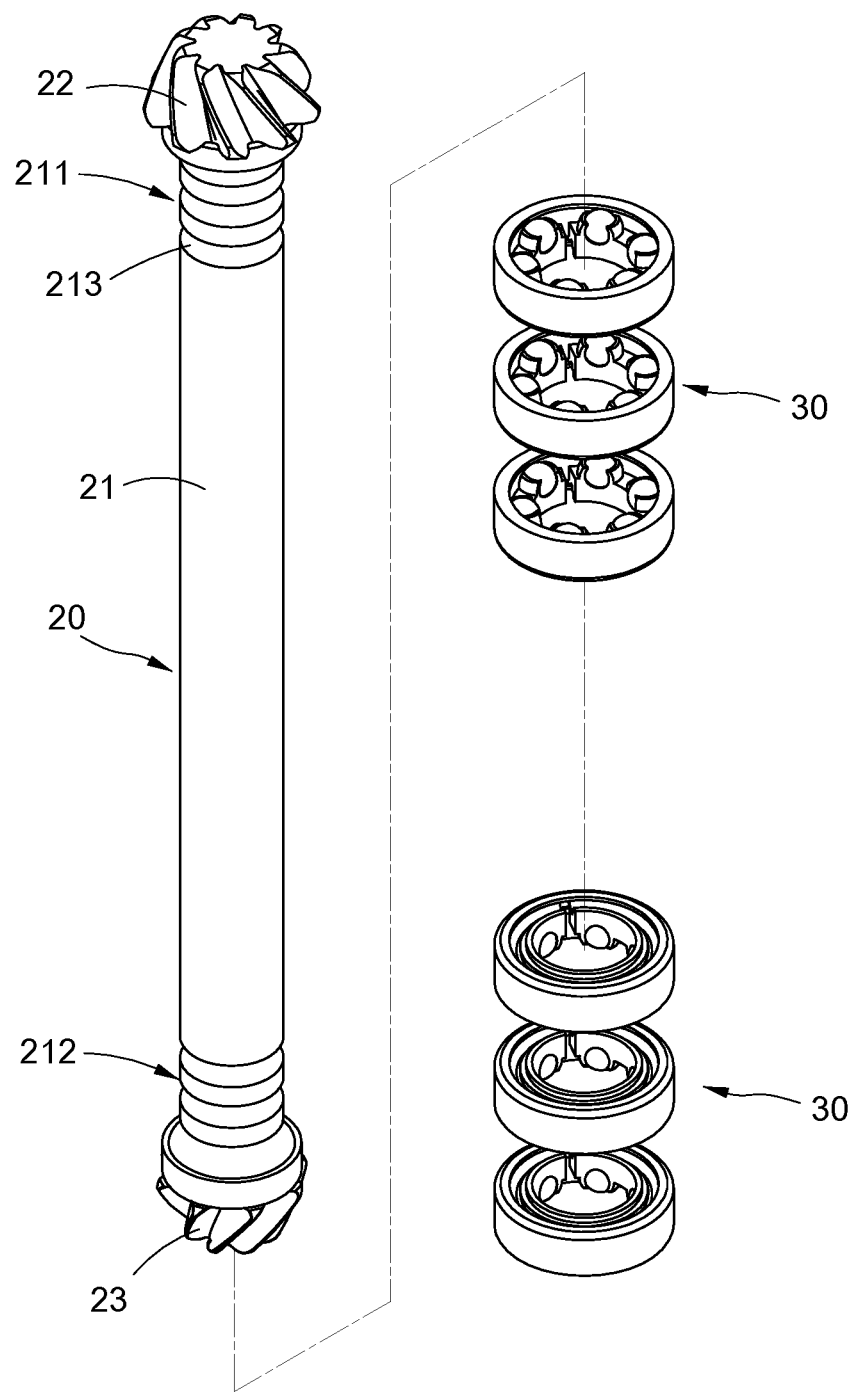
FIG. 4 is an exploded view of the transmission mechanism of the present disclosure.
Figure 5:
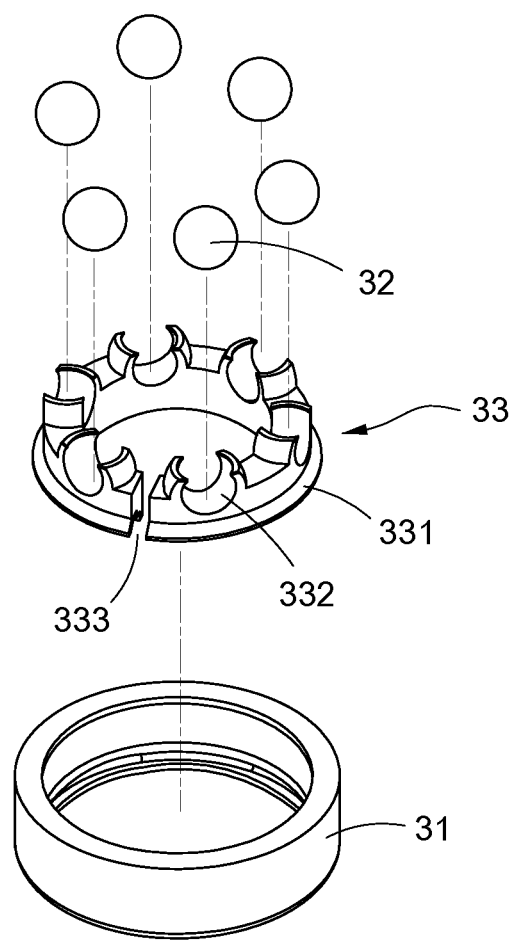
FIG. 5 is an exploded view of the supporting module of the present disclosure.

Please refer to FIG. 4 and FIG. 5. The transmission mechanism 20 is arranged at an internal of the crank 11 and mainly includes a rotating axle 21, a first gear 22 and a second gear 23. The rotating axle 21, the first gear 22 and the second gear 23 are integrally formed as one unit. The first gear 22 and the second gear 23 are bevel gears. The rotating axle 21 includes a first end 211 and a second end 212 away from the first end 211. The first gear 22 extends from the first end 211 and is engaged with the axle-end gear 12 for transmission. The second gear 23 extends from the second end 212 and is engaged with the pedal-end gear 13 for transmission. The first end 211 and the second end 212 include a plurality of circular grooves 213 formed thereon respectively. The circular groove 213 may also be designed to include single groove.

Each one of the supporting modules 30 is mounted to (sheathes) the first end 211 and the second end 212 of the rotating axle 21 respectively. As shown in FIG. 5, each one of the supporting modules 30 mainly includes an outer ring 31, a plurality of rollers 32 and a positioning ring 33. Each one of the rollers 32 is partially received inside the circular groove 213 and is surrounded by the outer ring 31. The positioning ring 33 is arranged at the internal of the outer ring 31 and is used to separate and position each roller 32. The positioning ring 33 mainly includes a ring base 331 and a plurality of roller accommodating portions 332 extended upward from the ring base 331. The roller accommodating portions 332 are arranged spaced apart from each other at an equal distance and used to accommodate each one of the rollers 32 respectively. In addition, the ring base 331 includes an opening 333 and is mainly provided to allow the positioning ring 33 to generate torsional deformation in order to be mounted to (sheathes) the rotating axle 21 and to be pushed into the outer ring 31 for securement. In an exemplary embodiment, the inner diameter of the outer ring 31 is greater than one of the outer diameters of the first gear 22 and the second gear 23, in order to facilitate the assembly and installation thereof.

In an exemplary embodiment, single supporting module 30 may be arranged at the first end 211 and the second end 212 of the rotating axle 21. In addition, in another exemplary embodiment, a plurality of supporting modules 30 may be stacked onto each other, followed by arranging the supporting modules 30 at the first end 211 and the second end 212 of the rotating axle 21 respectively.

Please refer to FIG. 1. In an exemplary embodiment, the axle-clamping half piece A of the outer housing 111 and the another axle-clamping half piece B of the inner housing 116 jointly clamp each one of the supporting modules 30 and the rotating axle 21. An upper end of the axle-clamping half piece A of the outer housing 111 and an upper end of the another axle-clamping half piece B of the inner housing 116 jointly define an upper abutment wall C (as shown in FIG. 7). A lower end of the axle-clamping half piece A of the outer housing 111 and a lower end of the another axle-clamping half piece B of the inner housing 116 jointly define a lower abutment wall D (as shown in FIG. 7). Each one of the supporting modules 30 at the top abuts against the upper abutment wall C, and each one of the supporting modules 30 at the bottom abuts against the lower abutment wall D, such that the axial pushing force in the vertical direction of the rotating axle 21 may be eliminated, in order to achieve greater operation stability of the transmission mechanism 20.

Please refer to FIG. 1. In an exemplary embodiment, the circumferential edge of the outer housing 11 includes a sealing outer plate 111A formed thereon, and the circumferential edge of the inner housing 116 corresponding to the outer housing 11 includes a sealing inner surface 116A formed thereon. In addition, the inner housing 116 includes a plurality of mounting holes corresponding to each one of the riveting columns 114. The sealing outer plate 111A is mounted to (sheathes) the sealing inner surface 116A correspondingly, and each one of the riveting columns 114 penetrates into each one of the mounting holes 1161 respectively, and the outer housing 111 and the inner housing 116 are secured to each other firmly via a sealing and riveting process (as shown in FIG. 7).

Figure 6:
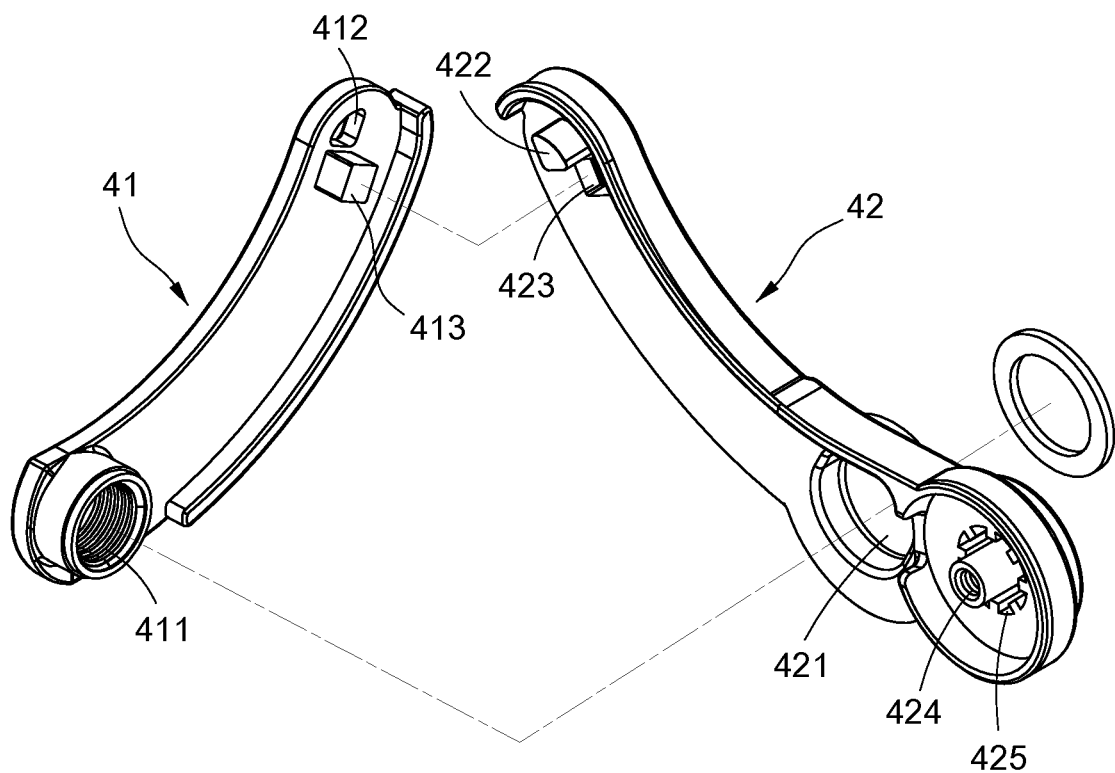
FIG. 6 is an exploded view of the rotating arm module of the present disclosure.

Please refer to FIG. 6. The rotating arm module 40 includes a first rotating arm 41 and a second rotating arm 42. Both the first rotating arm 41 and the second rotating arm 42 are arched rotating arms. The first rotating arm 41 is formed between the crank 11 and the second rotating arm 42, and it includes a pedal receiving column 411 formed thereon and a mounting slot 412 and a stud 413 formed at one end away from the pedal receiving column 411. The second rotating arm 42 includes a through hole 421 formed thereon and an insertion piece 422 and a receiving slot 423 formed at one end away from the through hole 421. In addition, the pedal receiving column 411 penetrates into the through hole 421, and the receiving slot 423 and the insertion piece 422 are attached to the stud 413 and the mounting slot 412 of the first rotating arm 41 respectively.

In an embodiment, the second rotating arm 42 includes a screw column formed at a lateral side of the through hole 421 and a plurality of locking slots 425 formed at an outer circumference of the screw column 424. The helical gear 134 includes a plurality of locking keys 1341. In addition, the screw column 424 penetrates into the helical gear 134, and each one of the locking keys 1341 is inserted into each one of the locking slots 425 respectively. Furthermore, a bolt penetrates from an outer side of the inner housing 116 and passes through the axle sleeve 131 to be fastened to the screw column 424 correspondingly.

Please refer to FIG. 8 to FIG. 11. The present disclosure further provides a bicycle crank assembly, mainly including a central axle 5, a pair of crank apparatuses 1 and a pair of adapters.

The central axle 5 mainly includes a main axle section 51 and an extension section 52 extending outward from two ends of the main axle section 51 respectively. The extension section 52 includes a gear column 521 provided for the cylindrical column 112 to be mounted and attached thereto via the gear-shaped hole 115. In addition, an end surface of the extension section 52 includes a screw hole provided for a bolt 53 to penetrate therein for securement.

Each one of the adapters 6 mainly includes an attachment member 61 and an abutment rod 62. Each one of the attachment members 61 mainly includes a ring piece 611 and a connecting arm 612 extended from the ring piece 611. The ring piece 611 includes an insertion ring formed at one side thereof and a plurality of protrusions 613 formed at another side thereof. The abutment rod 62 is fastened to the connecting arm 612 via a fastener 63 penetrating therethrough, and the abutment rods 62 are connected and fastened to each other.

In an exemplary embodiment, the bicycle crank assembly of the present disclosure further includes a chainwheel module 7 mounted to (sheathes) the inner housing 116 of one of the cranks 11. The chainwheel module 7 mainly includes a chainwheel 71 and a fixation rack 72. The fixation rack 72 is fastened to the chainwheel 71 via a fastener, such as a bolt, and the fixation rack 72 is mounted to (sheathes) the inner housing 116 of the aforementioned crank 11. In addition, the fixation rack 72 includes an insertion hole 721, and the inner housing 116 includes a protruding column 119 extended therefrom. The protruding column 119 penetrates into the insertion hole 721 correspondingly, in order to allow the crank 11 to drive the chainwheel module 7 to perform rotational movement.

The present disclosure is mainly applied to a bicycle 8. The bicycle 8 includes a bicycle frame 81, a central axle receiving seat 82 installed at a lower portion of the bicycle frame 81, a left fork 83 extending from the central axle receiving seat 82 towards the rear direction, a right fork 84 formed at the right side of the left fork 83 and a vertical tube 85 extending upward. Furthermore, the bicycle 8 further includes a pair of pedals 86, a pair of securement rings 87 and other necessary devices.

During the assembly, the central axle 5 is inserted into the central axle receiving seat 82 and is fastened to the central axle receiving seat 82 via the securement rings 86, in order to retain the central axle 5 inside the central axle receiving seat 82. In addition, the main axle section 51 of the central axle 5 is able to perform rotational movement inside the central axle receiving seat 82. Next, the insertion ring of each one of the adapters 6 is inserted in position corresponding to each one of the securement rings 87, in order to allow the adapters 6 to be formed at the two sides of the central axle receiving seat 82 respectively. The abutment rod 62 of the adapter 6 at the left side is connected to the abutment rod 62 of the adapter 6 at the right side, and the abutment rods 62 after the connection abut against the rear side of the vertical tube 85. Furthermore, the gear-shaped hole 115 of the cylindrical column 112 is aligned with the gear column 521 of the central axle 5 for mounting thereto. In addition, each one of the protrusions 613 of the ring piece 611 is inserted into each insertion slot 122 of the axle-end gear 12 correspondingly at the same time. Finally, a bolt 53 is inserted into the cylindrical column 112 of the crank 11 and is fastened to the screw hole 522 of the central axle 5 correspondingly, thereby allowing the rotation of each crank 11 to drive the central axle 5 to rotate.

Figure 12:
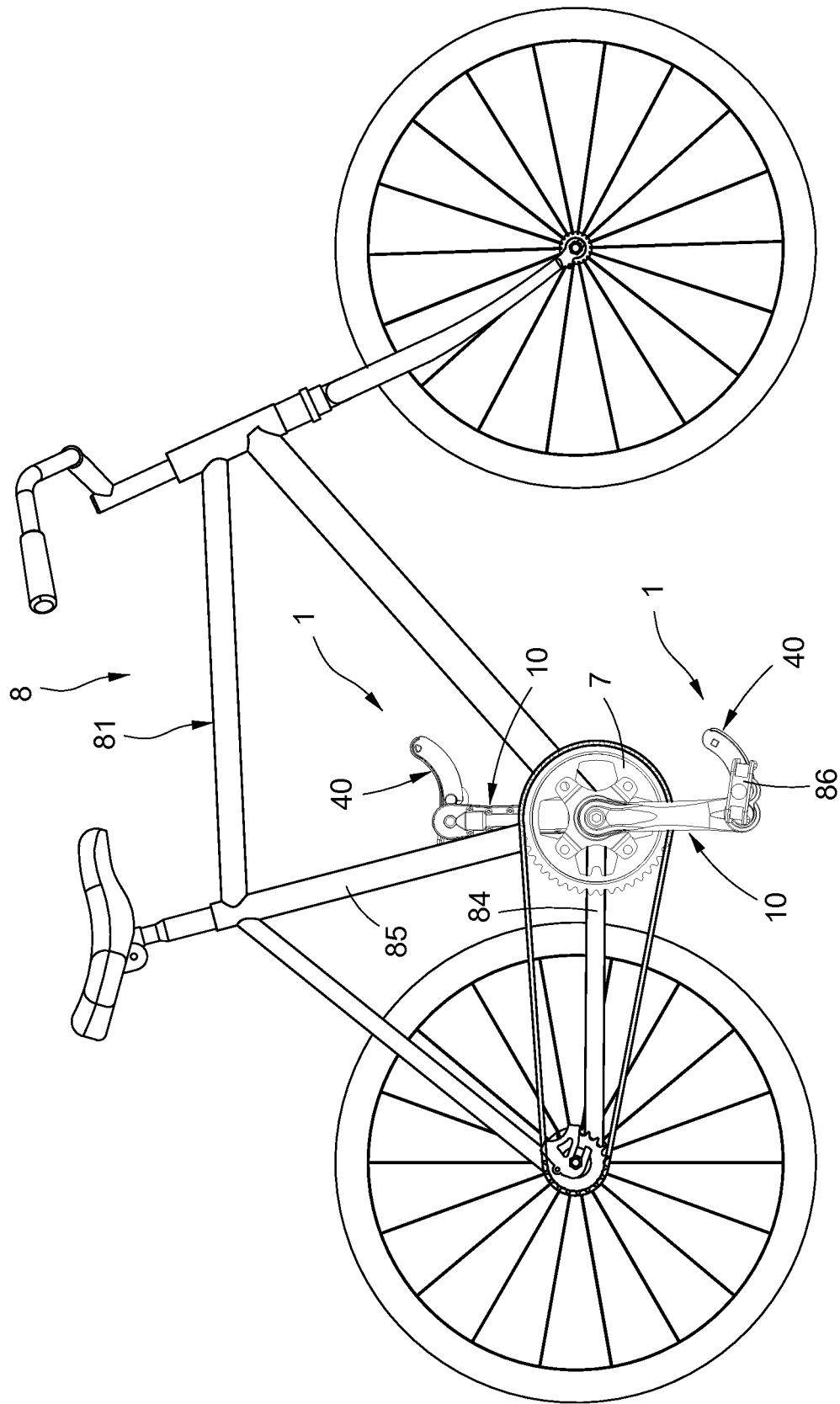
FIG. 12 is an assembly view of the crank assembly of the present disclosure applied to a bicycle.
Figure 13:
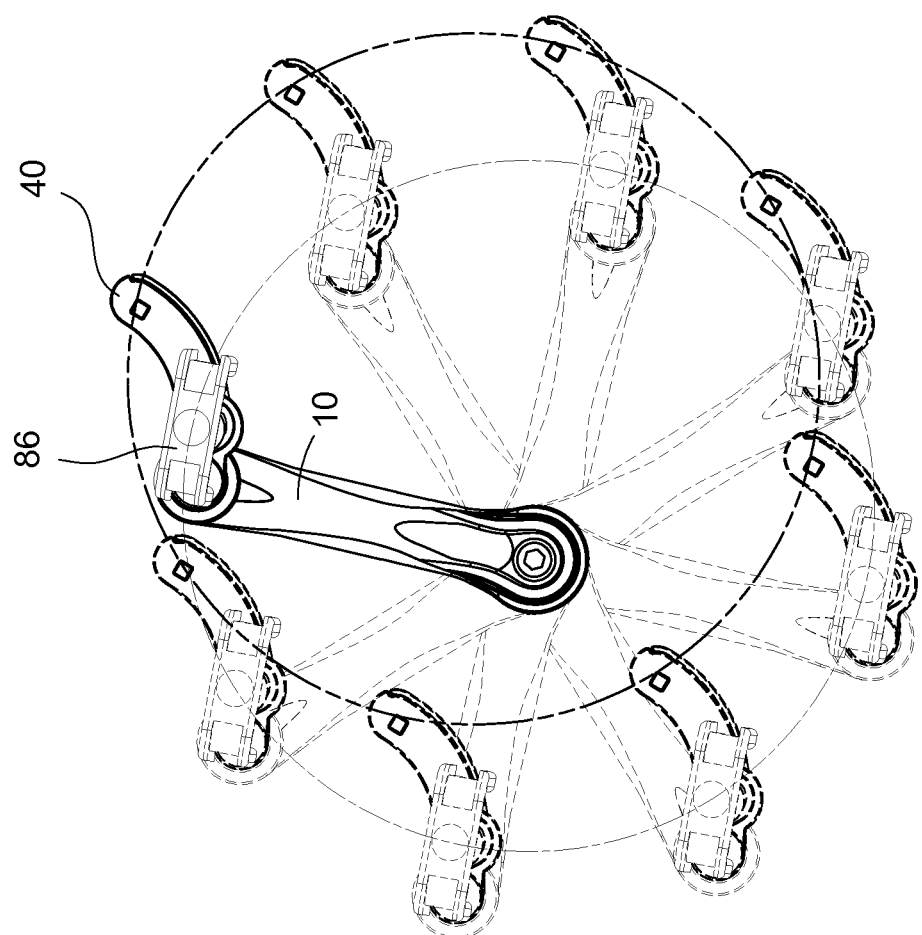
FIG. 13 is a state of use view of the bicycle crank assembly of the present disclosure.

Please refer to FIG. 12 and FIG. 13. The following provides further description related to the present disclosure. Since a moment arm from the axis of the axle-end gear 12 to the connecting area of the first rotating arm 41 and the second rotating arm 42 is greater than the length of the crank 11, according to the principle of moment ($M=F*d$, F: Acting Force, d: Moment Arm), under the condition where the moment remains the same, as the length of the moment arm increases, the acting force applied decreases.

During operation, an acting force is applied to the pedal 86, and the crank mechanism 10 drives the central axle 5 and the chainwheel module 7 to rotate together with each crank 11 via the cylindrical column 121. When the rotating arm module 40 rotates downward from the top position, the first gear 22 is driven by the axle-end gear 12, in order to drive the rotating axle 21 and the second gear 23 to rotate. In addition, the second gear 23 further drives the pedal-end gear 13 to rotate, such that the rotating arm module 40 maintains at a constant angle with the ground, and the motion trajectory of the center point of the pedal 86 performs a near-circular motion. Furthermore, the moving direction of the rotating arm module 40 is opposite from the moving direction of the crank 11.

Figure 14:
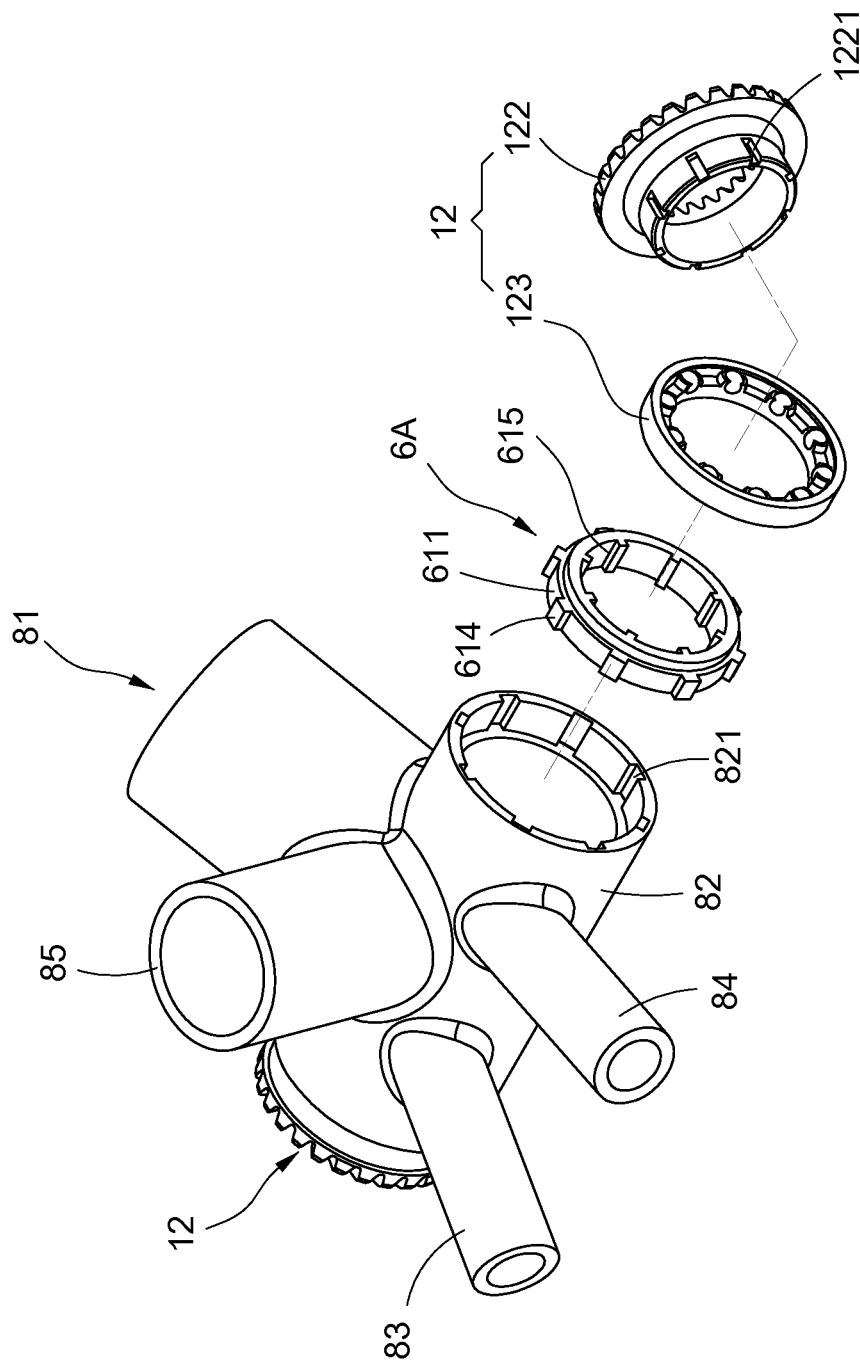
FIG. 14 is an exploded view of another exemplary embodiment of the adapter of present disclosure and a bicycle frame.
Figure 15:
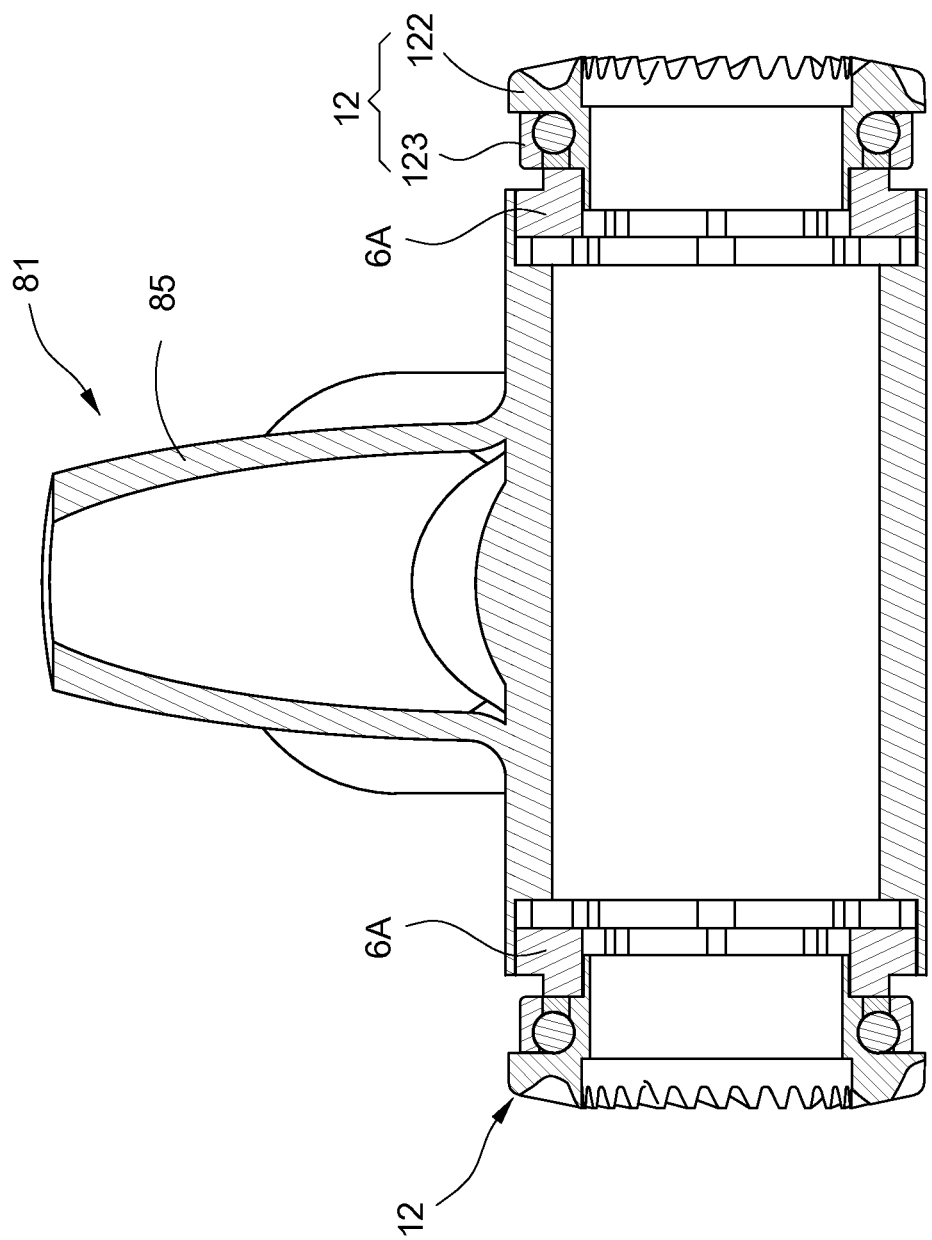
FIG. 15 is an assembly cross-sectional view of FIG. 14.

Please refer to FIG. 14 and FIG. 15. For the bicycle crank assembly of the present disclosure, in addition to the aforementioned exemplary embodiments, in this exemplary embodiment, two sides of the central axle receiving seat 82 further include a plurality of engagement slots 821. The adapter 6A mainly includes a ring piece 611, a plurality of outer protrusions 614 extended from an outer circumferential surface of the ring piece 611 and a plurality of inner protrusions 615 extended from an inner circumferential wall of the ring piece 611. Each one of the outer protrusions 614 is inserted into each one of the engagement slots 821 of the central axle receiving seat 82 correspondingly, and the inner protrusion 615 is inserted into each one of the insertion slots 1221 of the helical gear 122 of the axle-end gear 12 correspondingly. Accordingly, it is able to achieve the same effect as the aforementioned embodiments.

The above description is provided to illustrate the exemplary embodiments of the present disclosure only such that it shall not be treated as limitation to the claimed scope of the present disclosure. In addition, any equivalent modification made based on the present disclosure shall be considered to be within the claimed scope of the present disclosure.

What is claimed is:

1. A crank apparatus, comprising:
   a crank mechanism comprising a crank, an axle-end gear arranged at one end of the crank and a pedal-end gear arranged at another end of the crank;
   a transmission mechanism arranged at an internal of the crank, and comprising a rotating axle, a first gear and a second gear, the rotating axle comprising a first end and a second end, the first gear connected to the first end and engaged with the axle-end gear for transmission, the second gear connected to the second end and engaged with the pedal-end gear for transmission, at least one circular groove formed at the first end and the second end;
   at least one supporting module adapted to sheathe the first end of the rotating axle and at least one supporting module adapted to sheathe the second end of the rotating axle, each one of the supporting modules comprising an outer ring and a plurality of rollers, each one of the rollers received inside a respective one of the circular grooves and clamped between the rotating axle and the outer ring; and
   a rotating arm module comprising a first rotating arm and a second rotating arm, one end of the second rotating arm connected to the first rotating arm, another end of the second rotating arm connected to the pedal-end gear;

wherein the axle-end gear comprises an inner bushing, a helical gear and a roller bearing, the crank comprises an outer housing and an inner housing correspondingly attached to the outer housing, the outer housing comprises a cylindrical column, the inner bushing is adapted to sheathe the cylindrical column, the helical gear is adapted to sheathe the inner bushing, the roller bearing is adapted to sheathe the helical gear and be clamped by the inner housing and the helical gear jointly.

2. The crank apparatus according to claim 1, wherein each one of the supporting modules further comprises a positioning ring, the positioning ring is installed inside the outer ring to separate and position each one of the rollers.

3. The crank apparatus according to claim 2, wherein each positioning ring comprises a ring base and a plurality of roller accommodating portions extended from the ring base, each one of the rollers is arranged corresponding to each one of the roller accommodating portions, and the ring base comprises an opening.

4. The crank apparatus according to claim 1, wherein the rotating axle, the first gear and the second gear are integrally formed.

5. The crank apparatus according to claim 1, wherein the outer housing comprises an axle-clamping half piece arranged at an internal thereof, the inner housing comprises an another axle-clamping half piece arranged at an internal thereof, the another axle-clamping half piece is arranged corresponding to the axle-clamping half piece to clamp each one of the supporting modules and the rotating axle jointly.

6. The crank apparatus according to claim 1, wherein the pedal-end gear comprises an axle sleeve, a front roller bearing, a rear roller bearing and a helical gear, the inner housing comprises an insertion hole, the axle sleeve penetrates into the insertion hole correspondingly, the front roller bearing is adapted to sheathe one end of the axle sleeve and received inside the insertion hole, the helical gear is adapted to sheathe another end of the axle sleeve, the rear roller bearing is adapted to sheathe the helical gear and be clamped by the outer housing and the helical gear jointly.

7. The crank apparatus according to claim 1, wherein the outer housing comprises a sealing outer plate and a plurality of riveting columns, the inner housing comprises a sealing inner surface and a plurality of mounting holes, the sealing outer plate is adapted to sheathe the sealing inner surface correspondingly, each one of the riveting columns penetrates into each one of the mounting holes, and the outer housing and the inner housing are secured to each other via a sealing and riveting process.

8. A crank apparatus, comprising:
   a crank mechanism comprising a crank, an axle-end gear arranged at one end of the crank and a pedal-end gear arranged at another end of the crank;
   a transmission mechanism arranged at an internal of the crank, and comprising a rotating axle, a first gear and a second gear, the rotating axle comprising a first end and a second end, the first gear connected to the first end and engaged with the axle-end gear for transmission, the second gear connected to the second end and engaged with the pedal-end gear for transmission, at least one circular groove formed at the first end and the second end;
   at least one supporting module adapted to sheathe the first end of the rotating axle and at least one supporting module adapted to sheathe the second end of the rotating axle, each one of the supporting modules comprising an outer ring and a plurality of rollers, each one of the rollers received inside a respective one of the circular grooves and clamped between the rotating axle and the outer ring; and a rotating arm module comprising a first rotating arm and a second rotating arm, one end of the second rotating arm connected to the first rotating arm, another end of the second rotating arm connected to the pedal-end gear;

wherein the crank comprises an outer housing and an inner housing correspondingly attached to the outer housing, the outer housing comprises an axle-clamping half piece arranged at an internal thereof, the inner housing comprises an another axle-clamping half piece arranged at an internal thereof, the another axle-clamping half piece is arranged corresponding to the axle-clamping half piece to clamp each one of the supporting modules and the rotating axle jointly;

wherein an upper end of the axle-clamping half piece of the outer housing and an upper end of the another axle-clamping half piece of the inner housing jointly define an upper abutment wall, a lower end of the axle-clamping half piece of the outer housing and a lower end of the another axle-clamping half piece of the inner housing jointly define a lower abutment wall, the supporting module adapted to sheathe the first end of the rotating axle abuts against the upper abutment wall, and the supporting module adapted to sheathe the second end of the rotating axle abuts against the lower abutment wall.

* * * * *